US011542434B2

(12) United States Patent
Tenore et al.

(10) Patent No.: US 11,542,434 B2
(45) Date of Patent: Jan. 3, 2023

(54) CHAR SEPARATOR AND METHOD

(71) Applicant: Golden Renewable Energy, LLC, Yonkers, NY (US)

(72) Inventors: Anthony F. Tenore, Yonkers, NY (US); Oluwadare Oluwaseun, Yonkers, NY (US); David Fowler, Yonkers, NY (US); Anthony N. Tenore, Yonkers, NY (US)

(73) Assignee: Golden Renewable Energy, LLC, Yonkers, NY (US)

( * ) Notice: Subject to any disclaimer, the term of this patent is extended or adjusted under 35 U.S.C. 154(b) by 3 days.

(21) Appl. No.: 16/691,850

(22) Filed: Nov. 22, 2019

(65) Prior Publication Data

US 2020/0102503 A1 Apr. 2, 2020

Related U.S. Application Data

(60) Division of application No. 15/628,844, filed on Jun. 21, 2017, now Pat. No. 10,544,367, which is a (Continued)

(51) Int. Cl.
*B01D 53/02* (2006.01)
*C10B 47/44* (2006.01)
(Continued)

(52) U.S. Cl.
CPC .............. *C10B 47/44* (2013.01); *B01D 3/085* (2013.01); *C10B 53/07* (2013.01); *C10G 1/02* (2013.01);
(Continued)

(58) Field of Classification Search
CPC ........... C10B 47/44; C10B 53/07; C10B 7/10; B01D 3/085; C10G 1/02; C10G 1/10; C10K 1/02
See application file for complete search history.

(56) References Cited

U.S. PATENT DOCUMENTS

| 836,701 A | 11/1906 | Frederick |
| 2,458,068 A | 11/1943 | Fuller |

(Continued)

FOREIGN PATENT DOCUMENTS

| CA | 2 660 678 A1 | 2/2008 |
| CA | 2 668 886 A1 | 5/2008 |

(Continued)

OTHER PUBLICATIONS

Official Action received in Brazilian Patent Application No. BR112018076624-0 dated Mar. 30, 2021.
(Continued)

*Primary Examiner* — Christopher P Jones
(74) *Attorney, Agent, or Firm* — Riverside Law LLP

(57) ABSTRACT

The present invention relates to an apparatus and method for processing reusable fuel wherein the apparatus comprises a support body and a plurality of augers disposed within the support body. The augers may be configured to rotate against a vapor flow to clean carbon char from vapors comprising condensable and non-condensable hydrocarbons. A drive system may be connected to drive and control the plurality of augers. An exhaust system is connected to the support body. A gearbox housing is connected to the exhaust system, wherein the drive system is accommodated in the gearbox housing. A ventilation system is disposed within the gearbox housing. Additionally, a thermal expansion system may be connected to the support body.

14 Claims, 3 Drawing Sheets

Related U.S. Application Data continuation-in-part of application No. 15/477,312, filed on Apr. 3, 2017, now abandoned.

(60) Provisional application No. 62/318,178, filed on Jun. 21, 2016.

(51) Int. Cl.

| | | |
|---|---|---|
| *C10B 53/07* | (2006.01) | |
| *B01D 3/08* | (2006.01) | |
| *C10G 1/02* | (2006.01) | |
| *C10G 1/10* | (2006.01) | |
| C10B 7/10 | (2006.01) | |

(52) U.S. Cl.
CPC ............... *C10G 1/10* (2013.01); *C10B 7/10* (2013.01); *Y02P 20/143* (2015.11)

(56) References Cited

U.S. PATENT DOCUMENTS

| | | |
|---|---|---|
| 2,351,422 A | 6/1944 | Gohr |
| 2,916,121 A | 8/1953 | Lips et al. |
| 3,129,459 A | 4/1964 | Kullgren et al. |
| 3,151,784 A | 10/1964 | Tailor |
| 3,455,789 A | 7/1969 | Landers |
| 3,458,321 A | 7/1969 | Reinhart et al. |
| 3,797,702 A | 3/1974 | Robertson |
| 3,822,866 A | 7/1974 | Daester et al. |
| 3,822,886 A | 7/1974 | Cecchetti |
| 3,907,259 A | 9/1975 | Leclercq |
| 3,962,043 A | 6/1976 | Schmalfeld et al. |
| 3,981,454 A | 9/1976 | Williams |
| 4,025,058 A | 5/1977 | Mizuguchi |
| 4,123,332 A | 10/1978 | Rotter |
| 4,261,225 A | 4/1981 | Zahradnik |
| 2,616,519 A | 11/1982 | Crankshaw et al. |
| 4,426,018 A | 1/1984 | Ward |
| 4,437,046 A | 3/1984 | Faillace |
| 4,473,478 A | 9/1984 | Chivrall |
| 4,500,481 A | 2/1985 | Marx, III |
| 4,529,579 A | 7/1985 | Raahauge |
| 4,640,203 A | 2/1987 | Wolter et al. |
| 4,842,126 A | 6/1989 | McConnell |
| 4,875,847 A | 10/1989 | Wenger et al. |
| 5,032,143 A | 7/1991 | Ritakallio |
| 5,078,857 A | 1/1992 | Melton |
| 5,129,995 A | 7/1992 | Agarwal |
| 5,174,479 A | 12/1992 | Dufour |
| 5,205,225 A | 4/1993 | Milsap, III |
| 5,394,937 A | 3/1995 | Nieh |
| 5,589,599 A * | 12/1996 | McMullen ............... C10B 7/10 585/240 |
| 5,611,268 A | 3/1997 | Hamilton |
| 5,720,232 A | 2/1998 | Meador |
| 5,732,829 A | 3/1998 | Smith |
| 5,756,871 A | 5/1998 | Wang |
| 5,762,666 A | 6/1998 | Amrein et al. |
| 5,993,751 A * | 11/1999 | Moriarty ............... B01J 8/008 202/118 |
| 6,063,355 A | 5/2000 | Fujimura et al. |
| 6,109,902 A | 8/2000 | Goris et al. |
| 6,126,907 A | 10/2000 | Wada |
| 6,221,329 B1 | 4/2001 | Faulkner |
| 6,270,630 B1 | 8/2001 | Xing |
| 6,276,286 B1 | 8/2001 | Williams et al. |
| 6,298,751 B1 | 10/2001 | Ide et al. |
| 6,387,221 B1 | 5/2002 | Schoenhard |
| 6,455,789 B1 | 9/2002 | Allison |
| 6,634,508 B1 | 10/2003 | Ishigaki |
| 6,758,150 B2 | 7/2004 | Ballantine et al. |
| 6,834,508 B2 | 12/2004 | Bradley |
| 7,144,558 B2 | 12/2006 | Smith |
| 7,301,060 B2 | 11/2007 | Appel et al. |
| 7,301,080 B1 | 11/2007 | Wilson |
| 7,311,509 B2 | 12/2007 | Lupke et al. |
| 7,476,296 B2 | 1/2009 | Appel et al. |
| 7,692,050 B2 | 4/2010 | Adams et al. |
| 7,771,699 B2 | 8/2010 | Adams et al. |
| 7,906,695 B2 | 3/2011 | Giercke |
| 8,003,833 B2 | 8/2011 | Appel et al. |
| 8,109,902 B2 | 2/2012 | Middleton |
| 8,126,907 B2 | 2/2012 | Knighton |
| 8,200,238 B2 | 6/2012 | Gildea |
| 8,215,477 B2 | 7/2012 | Basaglia et al. |
| 8,304,590 B2 | 11/2012 | Hopkins et al. |
| 8,372,248 B1 | 2/2013 | Sherry |
| 8,518,218 B2 | 8/2013 | Ali et al. |
| 8,548,501 B2 | 10/2013 | Gildea |
| 8,574,325 B2 | 11/2013 | Jensen et al. |
| 8,801,904 B2 | 8/2014 | Miller |
| 8,809,606 B2 | 8/2014 | Appel et al. |
| 8,877,992 B2 | 11/2014 | Appel et al. |
| 9,045,693 B2 | 6/2015 | Wolfe |
| 9,052,109 B1 * | 6/2015 | Fowler ............... C10B 47/44 |
| 9,220,798 B2 | 12/2015 | McKee et al. |
| 9,275,655 B2 | 3/2016 | Wilson |
| 9,365,775 B1 | 6/2016 | La Crosse |
| 9,624,439 B2 | 4/2017 | Bakaya |
| 9,630,345 B2 | 4/2017 | Alsewailem |
| 9,795,940 B2 | 10/2017 | Miller et al. |
| 9,868,597 B2 | 1/2018 | Henry |
| 9,890,907 B1 | 2/2018 | Highfield, Jr. |
| 10,233,393 B2 | 3/2019 | Oluwaseun et al. |
| 2002/0048523 A1 | 4/2002 | Achtelik et al. |
| 2003/0047437 A1 | 3/2003 | Stankevitch |
| 2003/0098227 A1 | 5/2003 | Okamoto et al. |
| 2003/0127310 A1 | 7/2003 | Lemmons et al. |
| 2004/0003481 A1 | 1/2004 | Tarrant |
| 2004/0144698 A1 | 7/2004 | Hilpert et al. |
| 2005/0219943 A1 | 10/2005 | Yamane et al. |
| 2006/0021189 A1 | 2/2006 | Johnson |
| 2006/0211899 A1 | 9/2006 | Lee |
| 2007/0094929 A1 | 5/2007 | Kang et al. |
| 2007/0179326 A1 | 8/2007 | Baker |
| 2007/0193408 A1 * | 8/2007 | Martinez ............... F16H 57/029 74/609 |
| 2008/0038071 A1 | 2/2008 | Bodie et al. |
| 2008/0105141 A1 | 5/2008 | Duperon |
| 2008/0128259 A1 | 6/2008 | Kostek et al. |
| 2008/0202983 A1 | 8/2008 | Smith |
| 2008/0211899 A1 | 9/2008 | Busch |
| 2008/0286557 A1 | 11/2008 | Tucker |
| 2008/0288557 A1 | 11/2008 | Chiu |
| 2010/0008836 A1 | 1/2010 | Pecci |
| 2010/0024696 A1 | 2/2010 | Cauley et al. |
| 2010/0200229 A1 | 8/2010 | Jefferd |
| 2010/0202243 A1 | 8/2010 | Stirner |
| 2010/0289175 A1 | 11/2010 | Feichtinger et al. |
| 2011/0020190 A1 | 1/2011 | Miller |
| 2011/0089081 A1 | 4/2011 | Srinakruang |
| 2011/0290057 A1 | 12/2011 | Corcoran |
| 2012/0024106 A1 | 2/2012 | Brotzki |
| 2012/0024687 A1 | 2/2012 | Bratina et al. |
| 2012/0261247 A1 | 10/2012 | McNamara et al. |
| 2012/0289753 A1 | 11/2012 | Luengo Marin |
| 2013/0299333 A1 | 11/2013 | Fucker et al. |
| 2014/0054815 A1 | 2/2014 | Houk et al. |
| 2014/0121426 A1 | 5/2014 | Tandon |
| 2014/0332363 A1 * | 11/2014 | McGolden ............... C10B 57/10 202/150 |
| 2014/0332444 A1 | 11/2014 | Weiss et al. |
| 2015/0023826 A1 | 1/2015 | Desiron |
| 2015/0053542 A1 | 2/2015 | Liang |
| 2015/0064297 A1 | 3/2015 | Yang |
| 2015/0073181 A1 * | 3/2015 | Gorke ............... C10G 1/002 585/240 |
| 2015/0080624 A1 | 3/2015 | Gephart et al. |
| 2015/0166911 A1 * | 6/2015 | Reed ............... F23G 7/12 48/113 |
| 2015/0259603 A1 * | 9/2015 | Hallowell ............... C10B 53/02 202/93 |
| 2015/0314513 A1 | 11/2015 | Takamoto et al. |
| 2015/0362183 A1 | 12/2015 | Bertram |

(56) References Cited

U.S. PATENT DOCUMENTS

| | | | |
|---|---|---|---|
| 2015/0368563 A1 | 12/2015 | Funk | |
| 2016/0068771 A1* | 3/2016 | Appel | C10J 3/46 422/187 |
| 2016/0369883 A1* | 12/2016 | Chang | E05F 15/697 |
| 2017/0036378 A1 | 2/2017 | Yanev et al. | |
| 2017/0218278 A1 | 8/2017 | Bakaya et al. | |
| 2017/0247618 A1 | 8/2017 | Ishii | |
| 2017/0283707 A1 | 10/2017 | Gephart et al. | |
| 2017/0361329 A1 | 12/2017 | Behrens et al. | |
| 2017/0361558 A1 | 12/2017 | Tenore et al. | |
| 2018/0056262 A1 | 3/2018 | Miller et al. | |
| 2018/0371326 A1 | 12/2018 | Streiff | |

FOREIGN PATENT DOCUMENTS

| | | |
|---|---|---|
| CL | 199800382 | 11/1998 |
| CL | 201803679 | 12/2018 |
| CN | 1968765 A | 6/2005 |
| CN | 101700692 A | 10/2009 |
| CN | 101616970 A | 12/2009 |
| CN | 101700692 A | 5/2010 |
| CN | 101876286 | 11/2010 |
| CN | 102365477 | 2/2012 |
| CN | 104211629 A | 5/2013 |
| CN | 103153450 A | 6/2013 |
| CN | 202988144 U | 6/2013 |
| CN | 204699419 U | 10/2015 |
| CN | 204737927 U | 11/2015 |
| CN | 105542830 A | 5/2016 |
| DE | 1769235 A1 | 10/1971 |
| DE | 19724146 A1 | 12/1998 |
| DE | 10201869 A1 | 1/2002 |
| DE | 102 01 869 A1 | 7/2003 |
| DE | 10201869 A1 | 7/2003 |
| DE | 102 01 869 B4 | 8/2005 |
| DE | 202013007632 U1 | 10/2013 |
| DE | 20 2013 009 015 U1 | 1/2014 |
| DE | 20 2013 009 015 U1 | 3/2014 |
| EP | 2440633 A1 | 4/2012 |
| GB | 766003 | 1/1957 |
| GB | 1174133 | 5/1967 |
| GB | 1174133 A | 5/1967 |
| JP | 50-60681 U | 6/1975 |
| JP | S6063543 | 4/1985 |
| JP | 6063543 U | 5/1985 |
| JP | 60-179407 U | 11/1985 |
| JP | S6117879 | 1/1986 |
| JP | 6117879 B2 | 5/1986 |
| JP | 62187791 A | 8/1987 |
| JP | S62187791 | 8/1987 |
| JP | 2-229588 U | 9/1990 |
| JP | 07505824 | 6/1995 |
| JP | 7505824 A | 6/1995 |
| JP | 07256645 A | 10/1995 |
| JP | 1995256645 A | 10/1995 |
| JP | 1996216148 A | 8/1996 |
| JP | 08334221 | 12/1996 |
| JP | 8334221 A | 12/1996 |
| JP | 9-104874 A | 4/1997 |
| JP | 3104874 A | 4/1997 |
| JP | 2000001677 A | 6/1998 |
| JP | 2000001677 A | 1/2000 |
| JP | 20000107272 A | 1/2000 |
| JP | 2002037916 A | 7/2000 |
| JP | 2001296009 A | 10/2001 |
| JP | 2003-10825 A | 1/2003 |
| JP | 2005280254 A | 10/2005 |
| JP | 2006-89742 A | 4/2006 |
| JP | 2007529574 A | 10/2007 |
| JP | 2007-332222 A | 12/2007 |
| JP | 2008155582 A | 7/2008 |
| JP | 2009007537 A | 1/2009 |
| JP | 2009096966 A | 5/2009 |
| JP | 2009220433 A | 10/2009 |
| JP | 2010-500170 A | 1/2010 |
| JP | 2010500170 A | 1/2010 |
| JP | 2010184297 A | 8/2010 |
| KR | 20030051913 A | 6/2003 |
| KR | 10-2003-0051913 B1 | 7/2003 |
| KR | 20030051913 | 7/2003 |
| KR | 20030051913 B1 | 7/2003 |
| KR | 1020030051913 | 7/2003 |
| KR | 20050013304 A | 2/2005 |
| KR | 10-2006-0012934 A | 2/2006 |
| KR | 10-0686370 | 2/2007 |
| KR | 10-0686370 B1 | 2/2007 |
| KR | 100686370 B1 | 2/2007 |
| KR | 10088637061 | 3/2009 |
| KR | 10-2009-0117377 A | 11/2009 |
| KR | 1020090117377 A | 11/2009 |
| KR | 101006224 B1 | 1/2011 |
| KR | 20120103832 A | 3/2011 |
| KR | 10-2012-0103832 A | 9/2012 |
| KR | 20120103832 A | 9/2012 |
| KR | 10-2014-0110906 | 9/2014 |
| KR | 10-2014-0110906 | 9/2014 |
| SU | 509433 A1 | 4/1976 |
| SU | 509433 A1 | 5/1976 |
| WO | 90/11475 | 10/1990 |
| WO | 90/11475 A1 | 10/1990 |
| WO | 01/05910 A1 | 1/2001 |
| WO | 0105910 A1 | 1/2001 |
| WO | 2008/017953 A2 | 2/2008 |
| WO | 2008017953 A2 | 2/2008 |
| WO | 2009/129233 A2 | 10/2009 |
| WO | 2009129233 A2 | 10/2009 |
| WO | 20090129233 A2 | 10/2009 |
| WO | 2009136737 | 11/2009 |
| WO | 2011/132210 A1 | 10/2011 |
| WO | 2017116733 | 7/2017 |
| WO | 2017221181 A1 | 12/2017 |

OTHER PUBLICATIONS

Official Action received in Japanese Patent Application No. 2018-566447 dated Mar. 12, 2021.

Official Action received in Japanese Patent Application No. 2018-566366 dated Feb. 9, 2021.

Official Action received in Japanese Patent Application No. 2019-512039 dated Feb. 26, 2021.

Official Action received in Panamanian Patent Application No. 92432-01 mailing date unclear.

Official Action received in Saudi Arabian Patent Application No. 518400408 dated Mar. 31, 2021.

Official Action received in Chinese Patent Application No. 201780041724.2 dated Apr. 2, 2021.

Official Action received in Columbian Patent Application No. NC2019/0000773 dated Feb. 12, 2021.

Official Action received in European Patent Application No. 17823725.1 dated Jan. 22, 2021.

Official Action received in Japanese Patent Application No. 2018-568870 dated Mar. 12, 2021.

Official Action received in Chinese Patent Application No. 2017800417331 dated Apr. 6, 2021.

Official Action received in Columbian Patent Application No. NC2019/0000790 dated Feb. 8, 2021.

Official Action received in Singapore Patent Application No. 11201811050P dated Mar. 4, 2021.

Office Action received in Brazilian Patent Application No. BR112018076624-0 dated Oct. 28, 2020.

Office Action received in Japanese Patent Application No. 2018-566447 dated Nov. 10, 2020.

Examination Report received in Indian Patent Application No. 201927001910 dated Nov. 13, 2020.

Office Action received in Chinese Patent Application No. 2017800425770 dated Nov. 17, 2020.

Examination Report received in Indian Patent Application No. 201827046572 dated Dec. 2, 2020.

(56) References Cited

OTHER PUBLICATIONS

Office Action received in Brazilian Patent Application No. BR112019000218-9 dated Nov. 16, 2020.
Examination Report received in Indian Patent Application No. 201927004293 dated Oct. 20, 2020.
Office Action received in Japanese Patent Application No. 2018-568870 dated Nov. 12, 2020.
Official Action received in European Patent Application No. 17 823 741.8-1104 dated Nov. 4, 2020.
Examination Report received in Indian Patent Application No. 201927004072 dated Nov. 24, 2020.
Office Action received in U.S. Appl. No. 15/641,471 dated Feb. 12, 2018.
Office Action received in U.S. Appl. No. 15/062,319 dated Feb. 2, 2018.
Office Action received in U.S. Appl. No. 15/641,471 dated Apr. 1, 2019.
Office Action received in U.S. Appl. No. 15/628,844 dated Feb. 26, 2019.
Office Action received in U.S. Appl. No. 15/628,922 dated Apr. 29, 2019.
Office Action received in U.S. Appl. No. 16/263,088 dated May 8, 2019.
U.S. Office Action dated May 3, 2018 in U.S. Appl. No. 15/062,319.
Office Action received in U.S. Appl. No. 16/263,088 dated Aug. 29, 2019.
Office Action received in U.S. Appl. No. 15/641,471 dated Aug. 15, 2019.
Office Action received in U.S. Appl. No. 15/628,844 dated Jun. 19, 2019.
Official Action received in Chilean Application No. 201803679 (3679-2018) dated Aug. 1, 2019.
Office Action received in U.S. Appl. No. 15/641,471 dated Sep. 27, 2019.
Search Report and Written Opinion received in PCT Application No. PCT/IB2017/053713 dated Sep. 20, 2017.
Search Report and Written Opinion received in PCT Application No. PCT/IB2017/053714 dated Sep. 20, 2017.
Search Report and Written Opinion received in PCT Application No. PCT/IB2017/052811 dated Aug. 7, 2017.
Search Report and Written Opinion received in PCT Application No. PCT/IB2017/054058 dated Nov. 9, 2017.
Non-Final Office Action in corresponding U.S. Appl. No. 15/054,903 dated Oct. 3, 2018.
Non-Final Office Action in corresponding U.S. Appl. No. 15/593,579 dated Oct. 3, 2018.
Non-Final Office Action in corresponding U.S. Appl. No. 15/641,471 dated Oct. 25, 2018.
Official Action received in Columbian Patent Application No. NC2019/0000773 datd Apr. 28, 2020.
Official Action received in Brazilian Patent Application No. BR112019000051-8 dated May 11, 2020.
Official Action received in Japanese Patent Application No. 2018-568343 dated May 15, 2020.
Official Action received in New Zealand Patent Application No. 749216 dated Apr. 20, 2020.
Official Action received in U.S. Appl. No. 15/628,922 dated Apr. 9, 2020.
Official Action received in Chilean Patent Application No. 201803676 dated Mar. 16, 2020.
Official Action received in Chilean Patent Application No. 201803679 dated Mar. 31, 2020.
Official Action received in Chilean Patent Application No. 201803831 dated Mar. 16, 2020.
Office Action received in Dominican Republic Application No. P2018-0286 dated Sep. 28, 2020.
Office Action received in Panamanian Application No. 92484-01.
Office Action received in Brazilian Application No. BR112018076425-6 dated Aug. 10, 2020.
Office Action received in Chinese Application No. 2017800378727 dated Oct. 14, 2020.
Office Action received in Panamanian Application No. 92477-01.
Office Action received in Columbian Application No. NC2018/0013306 dated Sep. 14, 2020.
Office Action received in Dominican Republic Application No. P2018-0250 dated Sep. 28, 2020.
Office Action received in Korean Application No. 10-2018-7035626 dated Aug. 21, 2020.
Office Action received in Chinese Application No. 2017800417242 dated Oct. 20, 2020.
Office Action received in Chilean Application No. 201803876 dated Aug. 12, 2020.
Office Action received in Chinese Application No. 2017800417331 dated Aug. 20, 2020.
Office Action received in Dominican Republic Application No. P2018-0294 dated Sep. 28, 2020.
Office Action received in U.S. Appl. No. 15/628,922 dated Aug. 24, 2020.
Search Report and Expert Report received in Chilean Application No. 201803676 dated Dec. 16, 2019.
Extended European Search Report received in European Application No. 17814858.1 dated Jan. 8, 2020.
Expert Report received in Chilean Application No. 201803174 dated Dec. 31, 2019.
Office Action received in Chinese Application No. 201780042577.0 dated Jan. 21, 2020.
Extended European Search Report received in Application No. 17795725.5 dated Nov. 26, 2019.
Search Report and Expert Report received in Chilean Application No. 201803831 dated Nov. 13, 2019.
Office Action received in Canadian Application No. 3,029,578 dated Nov. 18, 2019.
Search Report and Expert Report received in Chilean Application No. 201803876 dated Dec. 2, 2019.
Extended European Search Report received in Application No. 17823741.8 dated Nov. 15, 2019.
Office Action received in Japanese Application No. 2018-568343 dated Jan. 8, 2020.
Office Action received in Korean Application No. 10-2019-7003338 dated Nov. 20, 2019.
Office Action received in U.S. Appl. No. 15/641,471 dated Jan. 21, 2020.
Office Action received in ARIPO Application No. AP/P/2018/011208 dated Jan. 7, 2021.
Office Action received in Chinese Application No. 201780038052.X dated Jan. 13, 2021.
Office Action received in Columbian Application No. NC2019/0000481 dated Jan. 20, 2021.
Office Action received in ARIPO Application No. AP/P/2018/011206 dated Jan. 6, 2021.
Office Action received in Brazilian Application No. BR112018076425-6 dated Jan. 19, 2021.
Office Action received in ARIPO Application No. AP/P/2018/011237 dated Jan. 19, 2021.
Written Opinion received in Singapore Application No. 11201810958U dated Feb. 18, 2020.
Extended European Search Report received in European Application No. 17814859.9 dated Jan. 30, 2020.
Written Opinion received in Singapore Application No. 11201810944S dated Feb. 18, 2020.
Official Action received in Chile Application No. 201803174 dated Mar. 16, 2020.
Extended European Search Report received in European Application No. 17823725.1 dated Feb. 27, 2020.
Examination Report received in New Zealand Application No. 749216 dated Feb. 27, 2020.
Office Action received in U.S. Appl. No. 15/641,471 dated Mar. 18, 2020.
Office Action received in Chinese Application No. 201780038052X dated Aug. 5, 2020.
Written Opinion received in Singapore Application No. 112018109443 dated Jul. 31, 2020.

(56) References Cited

OTHER PUBLICATIONS

Notification received in ARIPO Application No. AP/P/2018/011139 dated Aug. 12, 2020.
Office Action received in Brazilian Application No. BR112018073056-4 dated Jun. 16, 2020.
Office Action received in Chinese Application No. 2017800425770 dated Jun. 19, 2020.
Official Action received in Columbian Application No. NC2018/0013306 dated May 28, 2020.
Office Action received in Japanese Application No. 2019-512039 dated Jul. 2, 2020.
Office Action received in Brazilian Application No. BR20112019000218-9 dated Jun. 6, 2020.
Office Action received in U.S. Appl. No. 15/628,844 dated Sep. 11, 2019.
Office Action received in U.S. Appl. No. 15/628,922 dated Nov. 5, 2019.
Office Action received in Australian Patent Application No. 2017293458 dated Oct. 31, 2019.
Examination Report received in New Zealand Application No. 749263 dated Mar. 18, 2021.
Examination Report received in Australian Application No. 2017283225 dated May 31, 2021.
Office Action received in Chinese Application No. 2017800378727 dated Apr. 2, 2021.
Office Action received in Columbian Application No. NC2019/0000496 dated May 3, 2021.
Office Action received in Columbian Application No. NC2018/0013306 dated May 31, 2021.
Office Action received in Korean Application No. 10-2020-7029936 dated Apr. 30, 2021.
Non-Final Office Action in corresponding U.S. Appl. No. 15/477,312 dated Sep. 17, 2018.
Office Action received in New Zealand Patent Application No. 749216 dated Nov. 15, 2019.
Office Action received in U.S. Appl. No. 15/628,922 dated Aug. 27, 2019.
Search Report and Written Opinion received in PCT Application No. PCT/IB2017/053667 dated Sep. 12, 2017.
U.S. Office Action dated Jun. 6, 2018 in U.S. Appl. No. 15/641,471.

* cited by examiner

CHAR SEPARATOR AND METHOD

CROSS-REFERENCE TO RELATED APPLICATIONS

This application is a divisional of U.S. application Ser. No. 15/628,844, entitled "CHAR SEPARATOR AND METHOD", filed Jun. 21, 2017, which is a continuation-in-part of U.S. application Ser. No. 15/477,312, entitled "CHAR SEPARATOR," filed Apr. 3, 2017, which claims priority to U.S. Provisional Patent Application No. 62/318,178, entitled "CHAR SEPARATOR," filed Jun. 21, 2016. The entire contents and disclosures of these patent applications are incorporated herein by reference in their entirety.

This application makes reference to U.S. Provisional Application No. 62/319,768, filed Jun. 21, 2016, entitled "BAG PRESS SEPARATOR"; U.S. patent application Ser. No. 15/479,560, filed Apr. 5, 2017, entitled "BAG PRESS SEPARATOR"; U.S. patent application Ser. No. 15/054,903, filed May 12, 2016, entitled "CYCLONIC CONDENSING AND COOLING SYSTEM"; International Application No. PCT/IB2017/052811, filed May 17, 2017, entitled "CYCLONIC CONDENSING AND COOLING SYSTEM"; U.S. patent application Ser. No. 15/062,319, filed Jul. 8, 2016, entitled "HEATED AIRLOCK FEEDER UNIT"; International Application No. PCT/IB2017/053667, filed Jun. 20, 2017, entitled "HEATED AIRLOCK FEEDER UNIT"; U.S. Provisional Application No. 62/493,445, filed Jul. 5, 2016, entitled "CONVERTING WASTE PLASTIC INTO FUEL"; U.S. patent application Ser. No. 15/593,579, filed May 12, 2017, entitled "CYCLONIC CONDENSING AND COOLING SYSTEM"; U.S. patent application Ser. No. 14/757,227, filed Dec. 8, 2015, entitled "HEATED AIRLOCK FEEDER UNIT"; U.S. Provisional Application No. 62/089,617, filed Dec. 9, 2014, entitled "FEEDING REACTOR/EXTRUDER"; U.S. Provisional Application No. 62/089,628, filed Dec. 9, 2014, entitled "CYCLONIC CONDENSATION SYSTEM"; U.S. patent application Ser. No. 14/964,521, filed Dec. 9, 2015; U.S. Patent Application filed Dec. 9, 2015, entitled "HEATED AIRLOCK FEEDER UNIT"; U.S. Application filed Dec. 9, 2015, entitled "CYCLONIC COOLING SYSTEM"; U.S. Provisional Application No. 62/270,565, filed Dec. 21, 2015, entitled "BAG PRESS FEEDER"; U.S. Provisional Application filed Dec. 13, 2015, entitled "CHAR SEPARATOR"; U.S. Provisional Application No. 62/089,635, filed Dec. 9, 2014, entitled "RADIANT AIR CHILLER". The entire contents and disclosures of these patent applications are incorporated herein by reference.

BACKGROUND

Field of the Invention

The present invention relates generally to a device and method for heat exchanged technology. More particularly, it relates to an apparatus and method that is part of a re-useable fuel processing unit that allows for the absorption of char contained within vapor for processing and refining as it exists the reactor.

BACKGROUND OF THE INVENTION

The use of feeder airlock systems in re-useable energy apparatus is known. Examples of known devices include U.S. Pat. No. 5,762,666 to Amrein et. al, U.S. Pat. No. 3,151,784 to Tailor, and U.S. Pat. No. 3,129,459 to Kullgren et. al. These patents teach airlocks with side gates (Amrein et. al.), a rotary feeder to an airlock using vanes (Tailor), and an extruder using electric heat (induction) (Kullgren). The Tailor device teaches a rotary style apparatus in which steel vanes are mounted to a shaft and spin inside a machined round housing. An opening is in the top and bottom of the housing to allow material to flow in and out of the housing. The vanes block the difference pressures between the inlet and outlet. However, multiple limitations exist within this design. A first limitation is that the prior art re-useable energy apparatus will not tolerate heat as the disclosed structural design of the prior art will expand and allow internal pressures to leak outwardly. Another limitation is that the vanes act as pockets and also carry the atmosphere from the inlet to the outlet. A third limitation concerns the rotation velocity. The rotation velocity must be slow to allow time for the material to fall out of the discharge or material will be carried back around and prevent refill from the inlet. A forth limitation is that prior art devices will not allow for a molten material, e.g., such as hot plastic, to traverse therethrough.

The Amrein device discloses a feeder airlock system using two valves, with a hopper or pipe between them to allow material fill. Although this design tolerates heat, it allows the atmosphere to enter the feeder from the inlet and pass through to the discharge. This is a limitation as atmospheric gases may not be allowed in some processes as they will cause problems downstream. A second limitation with this device is that it will not allow for a molten material like hot plastic traversing therethrough.

The Kullgren device teaches an induction heated extruder. This extruder employs induction heating with the use of electric coils. Limitations with this apparatus are that it does not create an airlock so it does not allow for the continuous feeding of plastic material and it requires a thick long barrel that requires very high horsepower to achieve the internal pressure and heat necessary to melt the plastic, translating into a high power requirement.

Problems exist in prior art re-useable energy apparatus when particular carbon char is required to be removed from the fuel in order to produce a higher quality fuel. The prior art typically uses the following methods to remove char from liquid fuel: filtering to remove larger particulate matter from the fuel, but filters will become clogged and require periodic cleaning; distillation which can remove 99.9% of the carbon matter, but distillation is a sub-process outside the reactor that raises the cost of producing the re-useable fuel; cyclone systems are often used and try to remove most of the particles but can only remove large particles and the cyclone requires a heat source to prevent the vapors from condensing and forming liquid that re-collect the char; and, bag filters that are to limited to the heat the filter bags can withstand and will fail if they absorb liquid fuel.

Thus, there is a need for producing a more efficient re-useable energy apparatus that provides capability for optimizing usable and re-usable fuel vapors. There is also a need for providing improved systems that reduce and/or eliminate contaminants without employing added expenditures of additional equipment or additional filtering processes for achieving the same.

SUMMARY

According to first broad aspect, the present invention provides an apparatus for processing reusable fuel comprising a support body; a plurality of augers disposed within the support body; a drive system connected to drive and control the plurality of augers; an exhaust system connected to the support body; a gearbox housing connected to the exhaust system, wherein the drive system is accommodated in the gearbox housing; and a ventilation system disposed within the gearbox housing.

According to a second broad aspect, the present invention provides an apparatus for processing reusable fuel comprising a support body; a plurality of screw-type augers disposed within the support body; a drive system connected to drive and control the plurality of augers; a gearbox housing, wherein the drive system is accommodated in the gearbox housing; a ventilation system disposed within the gearbox housing; and an exhaust system, wherein the exhaust system is attached at one end to the support body and the exhaust system is attached at another end to the gearbox housing; wherein the plurality of augers are configured to rotate against a vapor flow to clean carbon char from vapors comprising condensable and non-condensable hydrocarbons.

According to a third broad aspect, the present invention provides a method for cleaning carbon char from vapors in a reactor comprising receiving a vapor flow of condensable and non-condensable hydrocarbons within a support body; controlling the temperature within the support body; rotating a plurality of augers disposed within the support body against the vapor flow, wherein respective flights of each of the plurality of augers intersect each other; and discharging lower carbon vapors from the support body as reusable fuel.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Definitions

Figure 1:
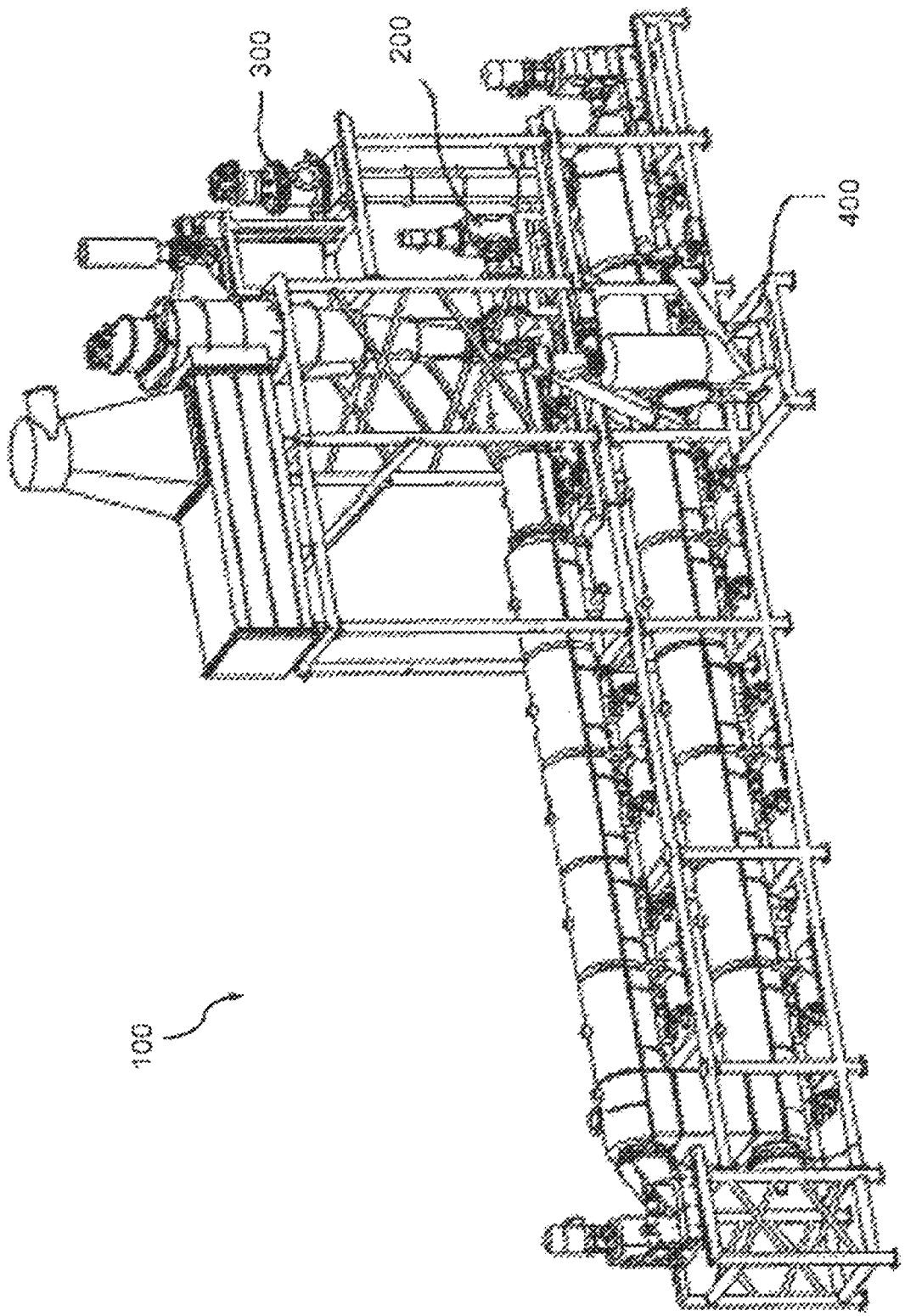
FIG. 1 is a schematic illustration of a re-useable energy apparatus according to one embodiment of the present invention.

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present invention, the term "comprising", the term "having", the term "including," and variations of these words are intended to be open-ended and mean that there may be additional elements other than the listed elements.

For purposes of the present invention, directional terms such as "top," "bottom," "upper," "lower," "above," "below," "left," "right," "horizontal," "vertical," "up," "down," etc., are used merely for convenience in describing the various embodiments of the present invention. The embodiments of the present invention may be oriented in various ways. For example, the diagrams, apparatuses, etc., shown in the drawing FIG.s may be flipped over, rotated by 90° in any direction, reversed, etc.

For purposes of the present invention, a value or property is "based" on a particular value, property, the satisfaction of a condition, or other factor, if that value is derived by performing a mathematical calculation or logical decision using that value, property or other factor.

For purposes of the present invention, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For the purposes of the present invention, the term "ambient air temperature" refers to generally to the temperature of the surrounding environment and more particularly the temperature of the surrounding environment of the disclosed cyclonic condensing and cooling system.

For the purposes of the present invention, the term "fractionation" refers to the separating of a mixture of hydrocarbon chains into a group of carbon chains or fractionations.

For the purposes of the present invention, the term "substantially" refers to a great or significant extent; for the most part; essentially.

For the purposes of the present invention, the term "thermal cracking" refers to a process used typically by refineries to break down carbon chains of petroleum compounds so that a desired carbon compound can be achieved. This process typically involves high heat, distillation, re-boiling, and energy intensive cooling processes.

Description

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

This application relates to an apparatus that is part of a re-useable fuel processing unit. Plastic waste material may be shredded and fed, for example, into a pyrolysis reactor. Applying heat above 350 degrees Celsius will cause the shredded plastic material to melt and vaporize. In one disclosed embodiment, the heated airlock feeder or system is the apparatus in which the shredded plastic material is fed into the pyrolysis reactor. It has been discovered that the prior art did not previously allow for the continuous feeding of heated plastic into the feeder while maintaining an air lock. In an exemplary design, disclosed embodiments may include the following equipment as described below:

Existing gear boxes, designed as short as possible to reduce material and labor on fabrication, have limited function with this utility patent application, as the short gear boxes are limited on taking a cantilever load as the force of trying to hold a long heave shaft puts extreme pressure on the leading bearing resulting is reduction of the life of the bearing or requiring a heavy duty bearing to handle the force. If a heavy duty bearing is used, this results in a larger bearing creating large pockets in the gear box housing. The larger pocket reduces the ability of the housing to support the bearing, so in turn the housing will be made thicker. This increases the cost of a standard gear box. This design extends the space between the bearings and reduces load on the bearings. By spacing the bearings further apart, the cantilever load is reduced, the bearing size can be smaller and the housing can be thinner, reducing the overall cost and improving the performance. The further apart the points on connection on the bearings, the straighter the alignment on the shafts, reducing wear and increasing the life of the gear box;

A flat bar attached between the cart and the frame that allows for the apparatus to expand and contract due to heat transfer as this apparatus incorporates thinner material in the reactor allowing for better heat transfer;

Multiple thermal regions employed, for example, as two heater zones, allowing plastic material to be transformed from a solid and shredded state to a liquid state; the solid and shredded plastic material at the start of the feeder and the liquid state at the end of the feeder. Between the shredded solid state and the liquid state exists plastic material in a molten state. The molten plastic material is thick and sticky and allows for the formation of the required pressure to create the airlock necessary to keep air from entering the reactor; and, The use of vapor gas (natural gas or syn-gas) and clamshell burners allowing for the external heat to be allowed in the processing of the plastic material whereas prior art used electric heater bands and internal pressure, resulting in high power consumption, to produce the heat required to process the plastic material. The use of vapor gas and clamshell burners allows for less power consumption, faster processing time, and more accurate and consistent heat production.

The use of clamshell burners allows heat to be generated over the entire exterior surface of the penetrating pipe and allowing for access to the reactor tube. The use of the clamshell burners allows for a low profile to the interior reactor reducing the amount of space between the heat source and the penetrating pipe surface, increasing the heat transfer without increasing the BTU value required by a burner system. The clamshell design combines both convection heat and radiant heat producing an even heat source around the penetrating pipe. The combining of the two types of heat is accomplished with the use of a perforated screen running the entire length of the penetrating tube and one third of the way up on the bottom inside of the clamshell burners. This design also prevents hotspots that normally occur in burner boxes. Another difference in this system compared to existing systems is that the igniting source is inside the clamshell burner box next to the perforated screen. The system contains flame sensors as well as a fan pressure switch to ensure airflow. Dual gas streams are used by adjusting the gas quantity or the air quantity, whereas existing systems use complicated air control dampers to adjust the air and gas ratio that may cause uneven burning of the fuel creating irregular flame size. The clamshell design that is part of the heated airlock feeder is not lined with refractory on all surfaces, but only on the top half of the clamshell. The fact that the lower half of the clamshell is not lined with refractory allows any heat buildup to dissipate through the entire box surface. This design also reduces the chance of auto-ignition of the mixed gas.

Figure 2:
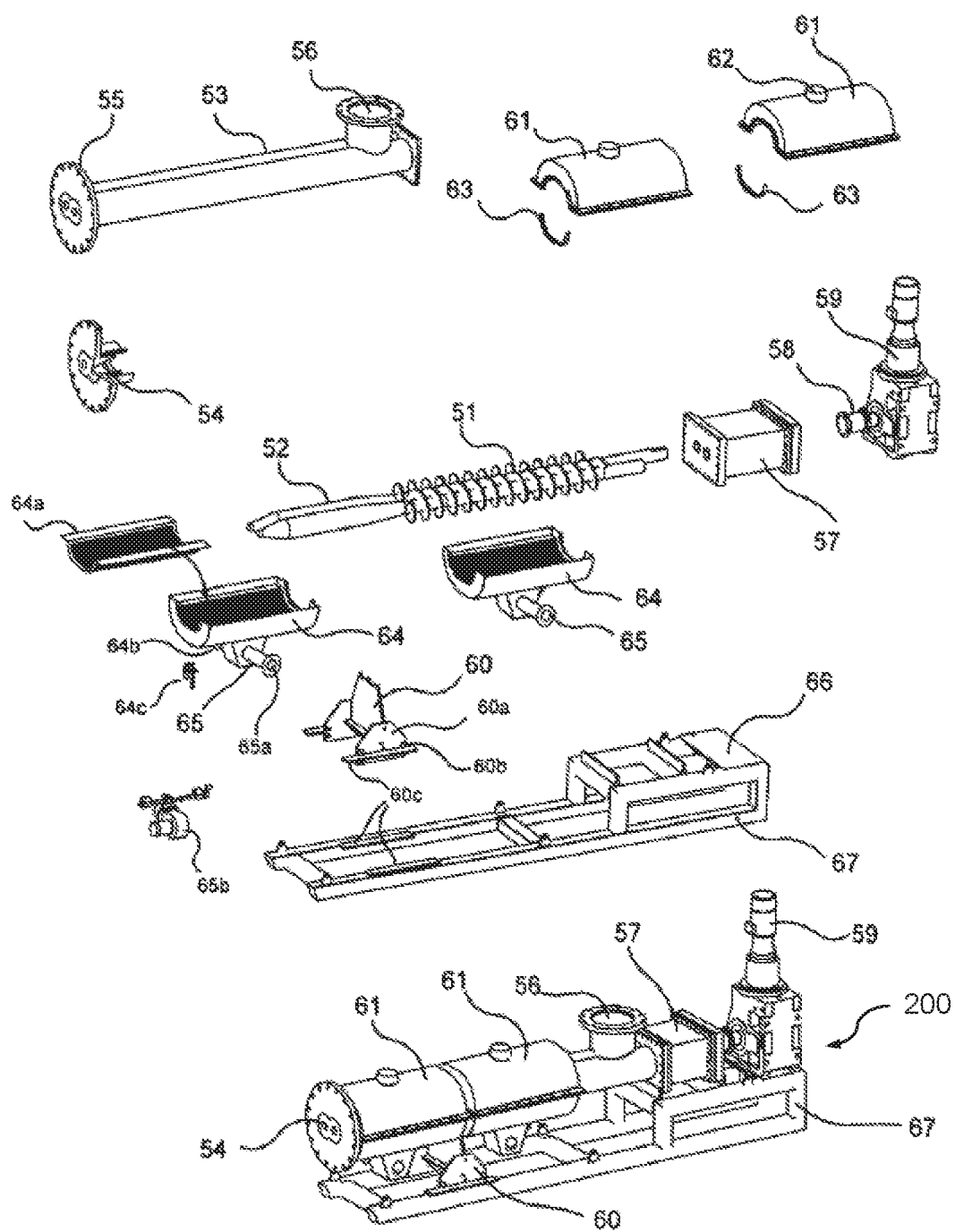
FIG. 2 illustrates an assembled view and an exploded view of a heated airlock feeder of the re-useable energy apparatus of FIG. 1 according to one embodiment of the present invention.

Disclosed embodiments allow the application of back pressure to the feed material between the cold material and the heated, melting material (molten plastic). The main components of the heated airlock feeder system are the drive, coupling, gearbox, augers, housing, clamshell burner boxes, expansion cart, and support frame. FIG. 1 depicts the entire assembly of the re-usable energy reactor system 100. FIG. 2 depicts the heated airlock feeder 200 that is part of the entire assembly of the re-useable energy reactor system. A drive system may comprise a helical gear drive FIG. 2 at 59 with a high torque ratio. Gear drive 59 is selected with a vertical footprint to reduce the system's overall length. This drive may be connected to sheer coupling. The coupling is designed to separate under overloading conditions to protect the gearbox.

In an exemplary embodiment, the coupling consists of two augers FIG. 2 at 51 which may be custom constructed. In a select embodiment, augers 51 are a machined three-part system. The first part of the augers is the drive shafts wherein one drive shaft may be longer than the second drive shaft. These are elongated axially rotatable. The middle section of the augers are elongated, axially rotatable screws each having an elongated shaft with outwardly extending helical flighting along the one-half of the length of each shaft starting at the gear box and connecting to a axially rotating smooth surface auger where the smooth part of each auger at the output side of the apparatus are machined so that the space between each auger and the elongated tubular barrel housing is less than 1 inch.

Augers 52 are located inside 53 of FIG. 2 which is inside 61 of FIG. 2. One auger has left-hand flights; the other auger has right hand flights that overlap the left hand flights. One of the augers 51 of FIG. 2 is longer than the other to protrude through the gearbox and connect to the drive coupling located in the gear box 57 of FIG. 2. The augers are constructed from solid materials with connection slips for machining purposes. The augers are constructed in segments to reduce the material and labor cost to fabricate the assembly. The segments are also interchangeable for simpler fabrication. The gear drives in the gearbox 57 are keyed into the shaft and sealed on both sides. The gearbox consists of double lip seals, bearings and spur gears. The length of the gearbox is extended to carry the cantilever load of the screw flights FIG. 2 at 51 and 52.

All surfaces are machined on the contacting side of both items 51 and 52 of FIG. 2 after welding. The housing 53 of FIG. 2 is pre-welded before machining the interior to require a straight design. The connecting flanges at both ends and the inlet match the gearbox and the reactor bolt pattern. FIG. 2 at 54 is machine tapered to reduce the outlet area to increase back pressure inside the heated airlock feeder (FIG. 2). This feeder assembly is welded to a reactor matching flange 55 of FIG. 2 and then welded to the body 53. Item 52 of FIG. 2 is welded to item 51 of FIG. 2 and then the entire assembly slides through the body 53 of FIG. 2 and protrudes flush to the end 54 of FIG. 2 at the outlet ports. The gearbox and the assembly housing rest on the support frame at 67 of FIG. 2. This assembly is bolted in the back is the main anchor point for the entire reactor. As the heated airlock feeder expands due to the heat it expands lengthwise. To address the expansion, this apparatus is supported with a cart 60 of FIG. 2 to allow the machine to expand, without creating stress on the supports. Existing prior art applications used shorter sections that are bolted together and constructed from a very thick material to absorb the heat. In the disclosed embodiment, the exemplary design utilizes a thinner material for better heat transfer but requires a moveable support system.

The solid, shredded plastic material (environmental temperature) is fed into the heated airlock feeder at 56 of FIG. 2, the heat is applied at 61 of FIG. 2, and the heated plastic material which is in a molten state is created from the solid shredded plastic material (environmental temperature) at where 51 connects to 52 of FIG. 2. The connection of 51 to 52 provides a continuous auger located inside 53 which are located inside 61. The airlock is created at the end 52 of FIG. 2 from the back pressure from the solid, shredded plastic material (environmental temperature) pushing on it.

This apparatus is used to induce heated plastic material into the main reactor and act as an airlock at the same time. By applying back pressure on the fed plastic material, between the solid, shredded plastic material and melting material (molten plastic material), a dead spot depicted in FIG. 2 at 52 is created. At 52 there are no flights on the shaft. This dead spot created by this process, depicted on FIG. 2 at 52, allows molten plastic material to build up pressure by the incoming solid, shredded plastic material (environmental temperature) being fed into the apparatus at 56 on FIG. 2. This area 52 also has a larger shaft area, which fills the void between 52 and 53. This larger shaft increases the pressure inside creating an airlock effect. The discharge of the airlock feeder is also restricted at 54 on FIG. 2 by the two openings that are greatly reduced in size compared to the opening where the solid, shredded plastic material (environmental temperature) is fed at 56 in FIG. 2. When the feeder is shut down, the plastic material remains inside the feeder in area at 52 in FIG. 2 because even as the feeder augers at 51 on FIG. 2 continue to rotate, the plastic material will not be pushed out from the housing at 53 on FIG. 2. The reason for this is because the heated molten plastic material is only pushed out when new solid, shredded plastic material (environmental temperature) is introduced. The incoming plastic material creates pressure and forces the molten plastic material in area 52 to be displaced. This means that when the airlock feeder cools off, the remaining plastic material will turn to a solid and seal until the next run. When the next run occurs, this plastic material will melt when reheated and allow the augers at 51 on FIG. 2 to rotate.

The disclosed apparatus also heats plastic materials to a vapor and liquid state with a clamshell burner at 61 on FIG. 2. The heating source for this airlock feeder may comprise a plurality of clamshell heaters FIG. 2 at 61 through 65. In the exemplary embodiment illustrated in FIG. 2, these two clamshell heater boxes produce the heat needed to make the airlock seal and start the vaporization of the plastic inside the feeder. The plastic material is heated from the discharge end to mid-way of the airlock feeder. By having two heater zones, the material is transformed from a liquid state on one end, to the shredded state on the other. Between this transition, exists a molten plastic material. This molten plastic is thick and sticky and forms the needed pressure to create an airlock affect. This clamshell boxes come in contact with the airlock feeder with the seal 63 of FIG. 2. This allows for greater expansion of the housing 53 of FIG. 4 from the clamshell fire boxes because of boxes are insulated on the inside, not allowing the metal to expand as on the outside. The heated airlock feeder has two clamshell box burners. One box covers 52 of FIG. 2 of the internal auger, and the other heats the auger at 51 of the auger. The advantage of two clamshell heater box burners is demonstrated on startup and shutdown of the reactor. Allowing the auger 51 of FIG. 2 to cool to a point that a plastic seals is achieved to create the airlock needed for start-up a shut down. The molten plastic cools into a solid around the auger and the housing, sealing off the feeder. The ability to cool rapidly is also a big advantage of using clamshell heaters. The burners' flame can be extinguished and the fans may continue to run to cool the housing 53 of FIG. 4.

The clamshell burner boxes are used as the heated airlock feeder requires a continuous even supply of heat to produce molten plastic. The correct amount of controlled heat is vital to the process for consistent material flow. Processes of this nature require heat from all directions. The need for high velocity airflow in a circular box would suffice for this process. Heater boxes with process structures penetrating through the box will also require a seal system to prevent leaks. Expansion of the penetrating structure in both length and diameter was considered in this design. The ability to both heat and cool is required in this process. The penetrating structure needs support capability to prevent damage to the heater box seals. The penetrating structure (pipe or tube) would need to be supported outside the heater boxes. Due to heat expansion on the penetrating structure a mobile support is required. The requirement for controlling the expansion direction is also needed to prevent warping of the penetrating structure and deflection that would damage the heater box seals requiring a controlled support system to restrict deflection in the direction that might damage the equipment. Furnace heater boxes are used in many processes to produce heat required for incinerating, cooking, melting, and for other heat required processes. When a cylinder or tube penetrates a heater box, problems with uneven heating, seal leakage and expansion may occur. Also the need to access the penetrating tube and pipe is required. A clamshell design was implemented for these reasons. The clamshell design allowed for a circular shape to match the profile of the penetrating pipe or tube. This close profile along with high velocity airflow ensures even heating around the penetrating pipe. The clamshell design has a very low profile interior to reduce the amount of space between the heat source and the penetrating pipe surface, increasing the heat transfer without increasing the BTU value required by a burner system. Compared to a standard burner box where a burner is attached on one side of the box at a distance not allowing an open flame to come into contact with the penetrating pipe, this design uses very small flame points to distribute the heat one third of the way around the penetrating pipe. This reduces the total BTU value. This design combines both types of heat, convection and radiant, producing an even heat source around the penetrating pipe.

A perforated screen 61*a* of FIG. 2 was used that distributes the gas fuel and controls the flame height while allowing airflow through the heater box. A shelf burner package may be used to supply both the gas and air mixture for igniting. The difference in this system is the igniting source is inside clamshell burner box next to the perforated screen. A flame sensor is used to ensure ignition and a fan pressure switch is used to ensure airflow. Dual gases can be used by adjusting the gas quantity or the air quantity. Existing systems use complicated air control dampers to adjust the air to gas ratio, causing uneven burning of the fuel creating irregular flame size. The air velocity and pressure must be at a fixed rate to insure the mix gas exits the perforated holes as needed as not to allow for the mix gas to ignite under the perforated screen. This design overcomes this problem by stopping the gas flow and allowing the air to continue when the temperature is over a given set-point. When the system cools, low set-point gases are allowed back into the mix and reignited. This control is achieved, such as, with a standard PIO controller with thermocouples to indicate internal temperatures. The clamshell design allows for access to the refractory liner that is installed only on the top half of the clamshell. All known heater boxes are normally lined with refractory on all surfaces. The lower half of this clamshell has no refractory liner, allowing any heat buildup to dissipate through the box surface and it ensures that the surface temperature remains below the auto ignite point. The perforated screen acts as a pressure regulator between the mixed gas and the flame above. This chamber is being fed with ambient air and mixed gas, both at ambient temperature. This keeps the lower half of the clamshell cooler. Without refractory on the lower clamshell, refractory replacement is not needed. The radiant heat from the flame is not in contact with the bottom portion of the penetrating tube 53 of FIG. 2.

The airflow from the burner forces air around the penetrating to carrying heat completely around the penetrating to because of natural disturbance. The movement of this air regulates the radiant heat surface of the penetrating tube by pulling excessive heat into the airstream forcing the air around the penetrating tube through an exhaust port. The perforated screen has small flames running the entire length and one third around the penetrating tube. This prevents hotspots that normally occur in burner boxes. By heating the penetrating tube in all directions expansion occurs in all directions. To prevent deflection or misalignment of the penetrating tube while being heated, the expansion direction is controlled with a support system. The support attaches to the expansion tube and prevents movement from unwanted directions. The cart consists of cam followers that are pinched between two structural flat bars, one on each side of the cart. The cart width is designed so that it is within one-eighth of an inch in between the width of the two structural flat bars so that it drops between the structural flat bars and ensures lateral movement. The cam followers (rollers) support the weight of the penetrating tube while preventing it from expanding up or down. This allows for the control of expansion direct action is in a lateral movement only.

Continuing with FIG. 2, typical pipe support rollers allow expansion in multiple directions. This design restricts expansion to lateral movement only keeping the penetrating tube from misaligning. The assembly is mounted on a steel skid mount frame 67. The clamshell heater boxes consist of an upper 61 and lower 64 sections. These sections are connected with a matching bolted flange and a seal chamber 63 that encompasses the penetrating tube. The gas air inlet box is mounted on the bottom section 64 to allow air gas mix into the lower section. The lower section has a perforated metal screen 64a welded approximately 3 inches above the lower section 64. This acts as an air chamber to distribute mixed air and gas through the perforated screen. The amount and diameter of the holes in the perforated screen are vital to control the flame height while allowing the volume of gas and air mix to pass through. The lower clamshell 64 also has an air mixture box 65 and the burner connection port 65a connected to it. The mixer box 65 has a flared configuration to distribute the air gas mix evenly under the perforated screen 64a. The mixer box 65 creates some back pressure to the air gas mixture which ensures a consistent gas air ratio for each opening in the perforated screen 64a.

A burner can be connected to the port 65a. The burner igniter, along with the flame indicator, is located to the top of the perforated screen 64a. An access pipe 64b is used to penetrate through both the lower clamshell 64 and the perforated screen 64a, for an igniter and for the flame sensor 64c to be mounted. A continuous pilot light 64c is installed through this pipe and stops above the perforated screen 64a. The pilot light proof of flame is required to indicate a flame is present until gas is allowed into the air gas mixture. When the heat set point is reached the gas alone, from the air gas mixture, ceases while the fan continues to run and push fresh air through the burner box. The pilot light continues to run in this phase of the heating process. Control of the heat is used with a PID controller. This controller is fed by thermocouples located on the top clamshell 61. A wide range of temperatures can be achieved and controlled with this type of process. The ability to switch between fuel gases is also possible with this design. Two sets of solenoid valves located on the burner 65b and have adjustable orifices to allow a fixed amount of gas to enter into a consistent amount of air. Natural gas mixed with air requires a different air mix ratio then syn-gas would require with the same air volume. Adjustment of the fixed orifices allow for switching between the gases. The expansion of the penetrating tube 53 is controlled by the cart support 60. This cart consists of heavy metal plate construction, resting between two flat bar retainers 60b that are welded to a frame 67. This allows the cam followers to roll on a smooth surface, preventing up and down movement. The cart width is only 118" less than the space between the flat bars 60c, preventing side to side movement and up and down movement while allowing left to right movement only.

By preheating and vaporizing the plastic biomass material under positive pressure and high heat, the main reactor depicted in FIG. 1 is shortened by about 40 feet to acquire the same performance as a standard reactor section would do. This reduces the reactor (FIG. 1) expansion length along with the auger FIG. 2. This reduction in size increases the torque in this area as the auger is shorter. The auger on the upper reactor depicted in FIG. 1 is where the most torque is required due to the large amount of liquid plastic contained within the reactor. The further the plastic travels down the reactor depicted in FIG. 1, the more plastic material is converted to vapor and the less the auger has to work.

The burner boxes depicted in FIG. 2 at 61 are in two sections. This allows for controlled heat zones. This control is needed to maintain the airlock effect during startup and shut down of the reactor. As the reactor heats up, it will start to build pressure inside. This pressure will look for a way out of the reactor. First is the heated reactor feeder that is the apparatus that is the subject of this patent application depicted in FIG. 2 and the second and third areas where the pressure may leave the system is at the ash/char discharge 400 (FIG. 1) and at the and the char separator 300 depicted in FIG. 3. The ash/char discharge 400 is a seal with slide gates preventing vapor loss. The char separator 300 depicted in FIG. 3 allows the vapors to be removed, as described below.

Advantages of the disclosed embodiments allow for the absorption of char contained within vapor that is leaving the reactor. The char, or carbon ash, that the disclosed apparatus allows for its absorption is created when the shredded plastic that enters the reactor makes contact with the reactor's hot surface area. As the shredded plastic makes contact with the reactor's hot surface, it is thinly spread across the surface of the reactor and heat from the reactor vaporizes the shredded plastic by design.

A thin layer of the shredded plastic, as well as the contaminants contained within the shredded plastic, is left behind on the reactor's steel tubing and as is cooked to a solid char which then becomes airborne. Small particles of char, e.g., approximately 3 microns or smaller, become airborne and travel with the fuel vapors. This char is collected with the vapors and condensed into a liquid in high concentrations and makes the produced fuel a substantially, and in some cases, an extremely thick liquid, because the char is a solid particulate contained within the liquid. This particular carbon char is required to be removed from the fuel in order to produce a higher quality fuel.

Figure 3:
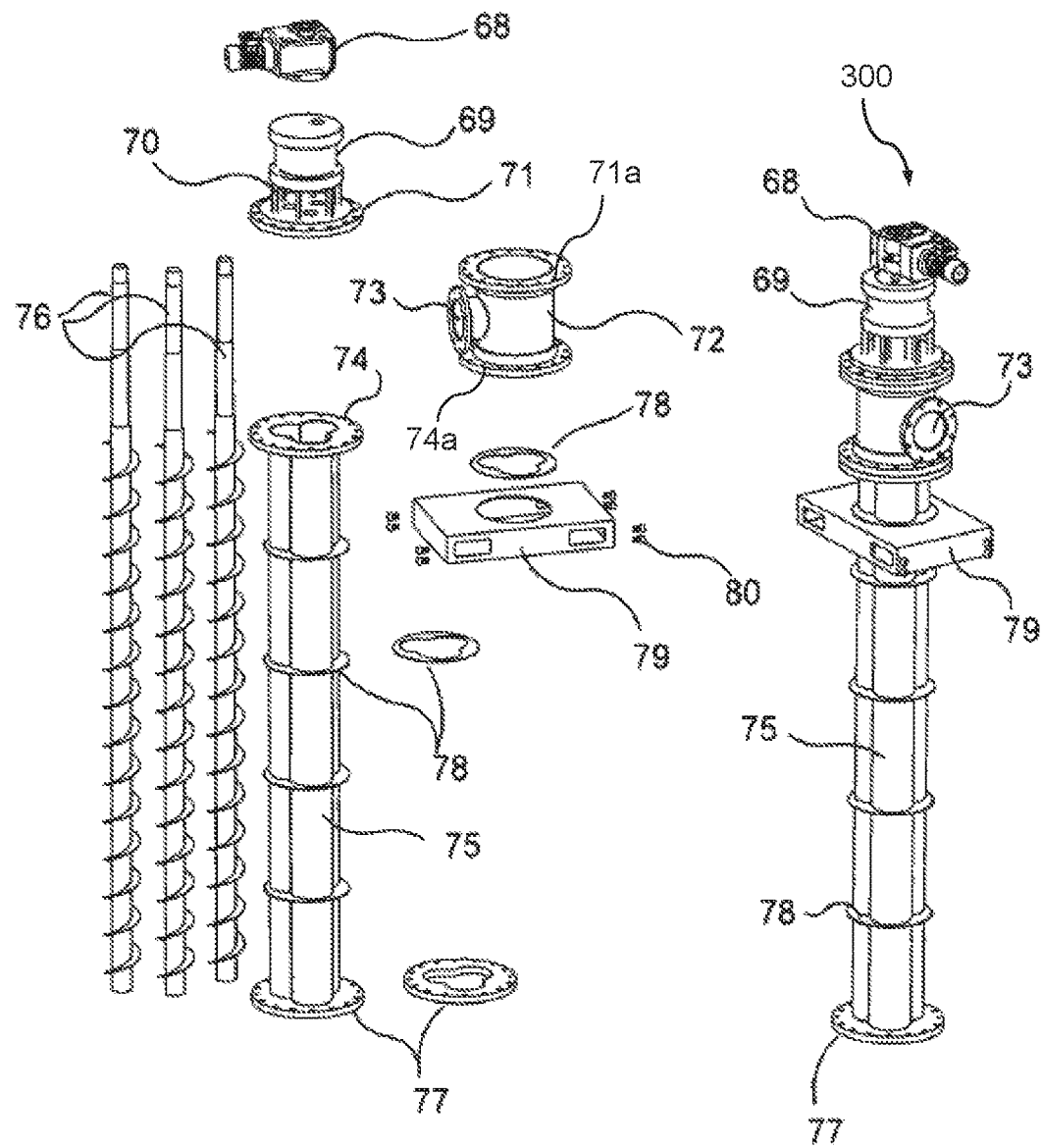
FIG. 3 illustrates an assembled view and an exploded view of a char separator of the re-useable energy apparatus of FIG. 1 according to one embodiment of the present invention.

In one exemplary embodiment, the char separator of the disclosed application not only addresses but substantially eliminates the problems of the prior art, as discussed above. Turning to FIG. 3, char separator 300 consists of a plurality of screw-type conveyor augers 76 running in a vertical split tube 75 that are placed so that their respective flights intersect with each other. Vertical split tube 75 may be regarded as a support tube structure for accommodating and providing a degree of protection to additional structures, as described below. In one disclosed embodiment, three screw conveyor augers 76 are utilized in within vertical split tube 75. Augers 76 may comprise stainless steel of any grade. Augers 76 provide for a downward rotation, cleaning each other from buildup as their flights intersect. As the hot vapors leave the reactor and enter the vertical split tube 75, they travel upwardly therein. The vapors lose heat as they rise up vertical split tube 75. The temperature in the column is controlled so that the favored hydrocarbon chain vapors pass through vertical split tube 75 and leave vertical split tube 75 at the discharge 73 where the vapors are collected. As the vapors rise and the temperature of the vapors is reduced to the value at where a high carbon chain fuel will condense, it will collect on the augers 76 where augers 76 will push the condensed fuel back to the reactor. The temperature of the vapor is dependent on a set point of the reactor which may vary in accordance with achieving a prescribed fuel boiling point(s). For example, in an exemplary embodiment, the vapor set point temperature may be established at approximately 700 F-800 F. The flow pattern of the vapors through char separator 300 generally follows the auger profile of the three augers 76 as it rises through the unit before it is exhausted.

The condensed hydrocarbon fuel is a sticky substance and may be generally classified as a heavy tar with carbon particles. The vapors flowing in vertical split tube 75 will travel across the sticky hydrocarbon fuel condensed on augers 76 where the sticky substance will catch the carbon ash that is traveling with the vapors as the carbon ash is constantly looking for a substance to which to make contact. The collected mass on augers 76 is then forced down into a lower reactor (e.g., separate system, not shown) where it returns to the reactor's heat returns to a heat zones through the discharge flange 77. The collected mass is then reheated in the lower reactor (e.g., separate system, not shown) of the re-useable fuel apparatus in which it vaporizes, breaking high carbon chains into lower carbon chains. The lower carbon chain material will then travel back through vertical split tube 75 and any carbon ash that travels with it will stick again to augers 76 and be returned and any lower carbon vapors will pass through vertical split tube 75 and be discharged from exhaust port 73 as clean vapor, for example, ultimately to a fuel cooling system. Thus, the clean vapor can be routed through a distillation column and/or a condensing unit in order to condense or cool down the condensable part of the vapor stream back to a liquid. The condensed liquid forms a diesel fuel carbon chain hydrocarbon which is an end product of the entire process.

The amount of heat rise in vertical split tube 75 can be controlled by both the RPM of the augers and the outside insulation of the column. For example, the column can be insulated by lagging on the outside to hinder heat dissipation to the surrounding. A drive system is provided to enable augers 76 within vertical split tube 75. The drive system may include an auger gearbox drive 68 that utilizes gearing to drive and control augers 76. In one embodiment, auger gearbox drive 68 utilizes spur gears to control the rotation and timing of the augers 76. By controlling the heat in vertical split tube 75 the carbon-chain hydrocarbon fuel selected by the heat value chosen will be allowed to pass through. Vapors comprised of condensable and non-condensable hydrocarbons can be cleaned of carbon char by the char separator 300, since the augers 76 can be configured to rotate against the vapor flow. By adjustment of ample speed, various parameters can be achieved towards a desired point or outcome.

Construction of vertical split tube 75 may consists of a plurality of split tubes. In one disclosed embodiment, three split tubes 75 may be utilized to encircle the augers, for example, as a prescribed geometrical shape such as a clover design in a final assembly depicted in FIG. 3. A clover design shape is utilized by select embodiments, because the augers 76 need to mesh into each other so that self-cleaning can be achieved. While a clover design is illustrated in FIG. 3, it is readily appreciated that any design shape suitable for providing an enclosed supported structure may be utilized in the disclosed embodiment as necessary. Accordingly one skilled in the art may utilize more than three augers 76 with accompanying different shapes to form an overall outer tube around the same. The shape is welded together and supported with a plurality of outer support bands or rings 78 to keep and maintain the overall shape of three split tubes 75 thereby keeping the assembled split tube structure intact throughout exposure to and/or due to heat warping.

Gearbox drives 68 may be accommodated within/throughout gearbox housing 69, to drive screw augers 76 via connected drive shafts of the screw augers 76. In one disclosed embodiment, gearbox housing 69 is designed with a packing seal space or air gap 70 disposed within gearbox housing 69, as further described below. Gearbox housing 69 may also comprise a support flange and seal 71 for connecting to an exhaust housing 72, detailed below.

A connecting flange 74 may be provided at one end of vertical split tube 75. An exhaust system provided as exhaust housing 72 having a corresponding attachment flange 74a at one end may be provided to attach to connecting flange 74 to provide a final connection. In the illustrated exemplary embodiment, exhaust port 73 is disposed in a side of exhaust housing 72. Another corresponding attachment flange 71a may be provided at another end of exhaust housing 72 for providing a final corresponding connection with support flange and seal 71 of gearbox housing 69. Vertical split tube 75 may provide a discharge flange 77 at another end configured for connection with, for example, another reactor (e.g., separate system, not shown). A plurality of support rings 78 may be disposed at intermediate points along a length of vertical split tube 75 to provide support thereto and facilitate maintaining an outer peripheral shape of vertical split tube 75. The inner periphery of each support ring 78 may correspond to an outer peripheral shape of vertical split tube 75.

A thermal expansion system is provided as an expansion cart or rolling cart 79. Expansion cart 79 may be provided with cam followers 80. In on disclosed embodiment expansion cart 79 is disposed around a section of vertical split tube 75. In some select embodiments, vertical split tube 75 may be secured to expansion art 79 (such as via a welded connection). As further described below, expansion cart 79 is employed and designed to support char separator 300 in connection with the support structure of re-usable energy reactor system 100. In addition, while supporting char separator 300, expansion cart 79 allows movement of char separator 300 in accordance with any thermal expansion or contraction of the support structure of re-usable energy reactor system 100 due to temperature fluctuations.

The discharge gases are expected to be over 500 degrees Fahrenheit and may overheat the gear box 69. To prevent the gearbox oil from overheating a ventilation system is provided as an air gap 70 and therefore serves as a design feature in the unit to allow venting. Vertical split tube 75 is attached to the lower reactor and is configured to travel or move in accordance with and to accommodate any thermal expansion of the reactor. To do so, an expansion cart or rolling cart 79 is disposed generally at a top of vertical split tube 75. Expansion cart or rolling cart 79 is further configured in supported relation along an exterior structure such as the framing of a re-usable energy reactor system 100 (FIG. 1). In one exemplary disclosed embodiment, rolling cart 79 is configured with wheels received by corresponding tracks disposed, for example, along an accommodating structure of re-usable energy reactor system 100. The tracks may comprise a rigid design sufficient to accommodate the weight of char separator 300. Since the char handler is bolted directly to the bottom reactor (which expands, contracts or elongates due to temperature fluctuations) as the reactor expands, rolling cart 79 can roll on its associated wheels in accordance with any thermal expansion to cater to expansion in a prescribed direction.

Where the column attaches to re-usable energy reactor system 100, that section of the reactor is smaller in diameter and uses a ribbon type flight to allow for faster removal of solids while allowing vapors to pass back through the ribbon flights. This section has a reverse rotation to the main auger located within the reactor where the main auger is pushing any dry char or heavy fuel deposits towards the char discharge. This section of the main reactor has two controlled heated zones that will re-heat and help in thermal cracking the high carbon chains that are pushed back into the main reactor by char separator 300.

Advantages of the disclosed design provide a modular construction for quick shop assembly and quick installation. Disclosed embodiments allow for easy maintenance in the field. The disclosed modular design can be completely assembled and tested in the shop.

Having described the many embodiments of the present invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of cleaning carbon char from vapors comprising:
   providing an elongate support body having first and second ends;
   receiving a quantity of vapor comprising condensable and non-condensable hydrocarbons, lower carbon vapors and carbon char through an inlet at the second end of the support body, forming a vapor flow running from the second end to the first end of the support body;
   rotating a plurality of augers disposed within the support body against the vapor flow, wherein flights of each of the plurality of augers intersect each other;
   discharging lower carbon vapors from a first outlet positioned at the first end of the support body; and
   discharging at least a portion of the carbon char from a second outlet positioned at the second end of the support body.

2. The method of claim 1, further comprising:
   in the support body, condensing at least a portion of the condensable hydrocarbons into a high carbon chain fuel;
   driving at least a portion of the high carbon chain fuel in a direction opposite the vapor flow with the plurality of augers;
   heating the high carbon chain fuel until it vaporizes to break high carbon chains into lower carbon chains to produce low carbon vapor; and
   discharging the low carbon vapor from the first outlet of the support body.

3. The method of claim 2, wherein the temperature is controlled to manipulate the vapor flow of condensable and non-condensable hydrocarbons.

4. The method of claim 2, wherein the support body is oriented such that the vapor flow is vertical.

5. The method of claim 4, wherein the vapor flow is configured to run upwards in the support body; and
   wherein the high carbon chain fuel is configured to flow downwards in the support body.

6. The method of claim 4, wherein the support body is arranged as a plurality of split tubes.

7. The method of claim 6, wherein the plurality of split tubes is arranged in a clover shape.

8. The method of claim 6, wherein the the plurality of augers are disposed vertically within the plurality of split tubes.

9. The method of claim 2, further comprising controlling the temperature by adjusting a rotation speed of the plurality of augers or an outside insulation of the support body.

10. The method of claim 2, further comprising vaporizing a carbon-based material in a reactor to generate the vapor flow of condensable and non-condensable hydrocarbons.

11. The method of claim 10, further comprising adjusting a temperature of at least two controlled heating zones of the reactor.

12. The method of claim 11, further comprising expelling discharge gases at over 500 degrees Fahrenheit from the reactor.

13. The method of claim 10, further comprising:
   providing an exhaust system connected to the support body; and
   expelling discharge gases from the reactor through the exhaust system.

14. The method of claim 13, further comprising:
   providing a gearbox housing having an upper portion, a lower portion and a ventilation system disposed in between the upper portion and the lower portion;
   providing a drive system configured to rotate the plurality of augers;
   wherein the lower portion is connected to the exhaust system, and the drive system is positioned in the gearbox housing; and
   positioning the ventilation system entirely within the structure of the gearbox housing, wherein the ventilation system comprises an air gap.

* * * * *